United States Patent [19]

Bacchi

[11] Patent Number: 5,053,685
[45] Date of Patent: Oct. 1, 1991

[54] HIGH PRECISION LINEAR ACTUATOR

[75] Inventor: Paul E. Bacchi, Novato, Calif.

[73] Assignee: Kensington Laboratories, Inc., Richmond, Calif.

[21] Appl. No.: 473,547

[22] Filed: Jan. 31, 1990

[51] Int. Cl.5 .......................... H02K 7/10; H02P 5/00; G05B 19/40
[52] U.S. Cl. ...................................... 318/135; 310/80; 74/89.15
[58] Field of Search ........... 74/89.15, 424.8 R, 424 A; 33/784, 819, 820; 250/237 G; 310/80, 83, 78; 318/135

[56] References Cited

U.S. PATENT DOCUMENTS

| | | | |
|---|---|---|---|
| 1,366,096 | 1/1921 | Perry | 74/424.8 A |
| 4,273,482 | 6/1981 | Lloyd et al. | 318/571 |
| 4,362,980 | 12/1982 | Itzkowitz | 318/685 |
| 4,467,250 | 8/1984 | Thomasson | 318/436 |
| 4,607,956 | 8/1986 | Ishihara et al. | 33/707 |
| 4,709,178 | 11/1987 | Burr | 310/78 |
| 4,719,810 | 1/1988 | St. Cyr et al. | 74/424.8 R |

Primary Examiner—Steven L. Stephan
Assistant Examiner—D. L. Rebsch
Attorney, Agent, or Firm—Stoel, Rives, Boley, Jones & Grey

[57] ABSTRACT

A high precision linear actuator includes high fidelity mechanical linkages between the motor drive and the linear displacement output shaft. Rotational motor drive output is conveyed to a rotatable spindle (20) and lead nut assembly by means of belt driven sprockets. Rotation of the lead nut assembly is converted to linear displacement of a non-rotating lead screw and output shaft. Linear actuators of the present invention also incorporate a feedback control feature employing Moire fringe pattern techniques to continuously monitor the position of the output shaft.

12 Claims, 3 Drawing Sheets

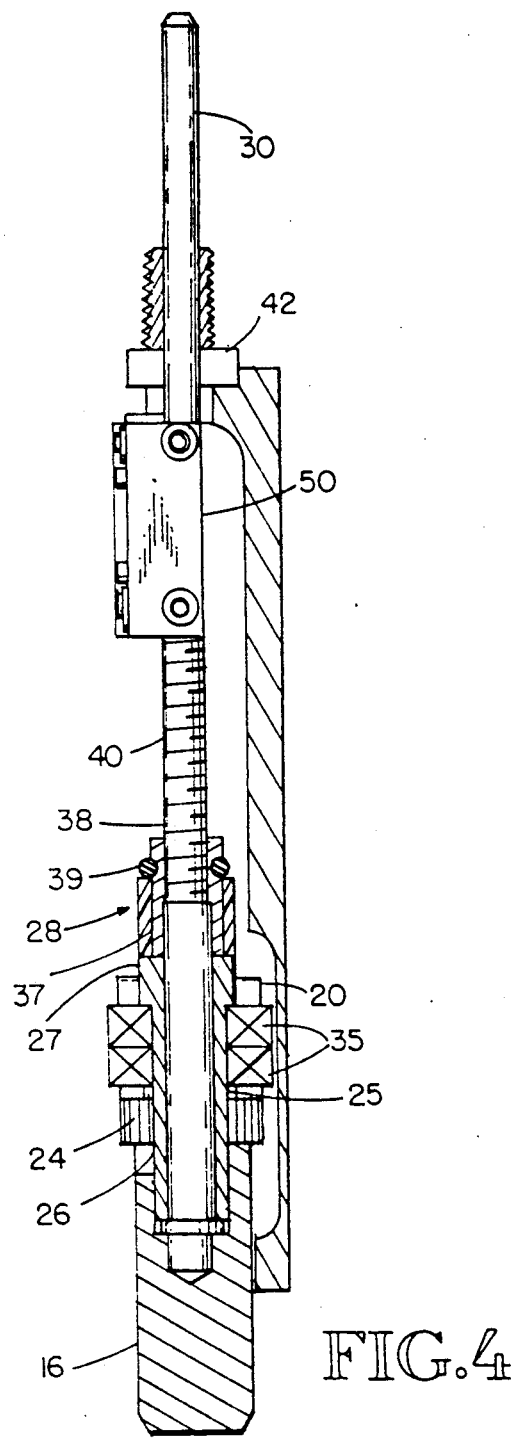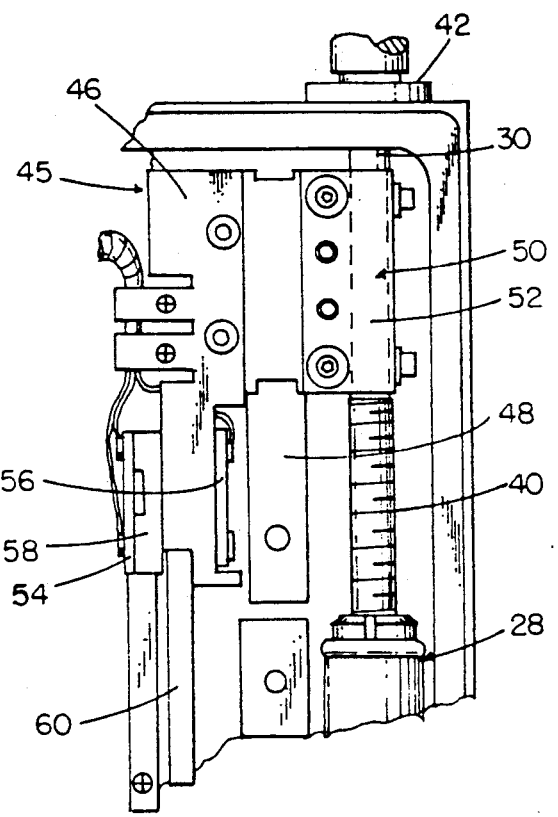
FIG.4
FIG.5

HIGH PRECISION LINEAR ACTUATOR

TECHNICAL FIELD

This invention relates to improved linear actuators providing precise, repeatable linear displacements in response to voltage input signals. Linear actuators are employed in numerous applications, such as biomedical and medical devices, micromachining apparatus, laser targeting devices, and the like.

BACKGROUND OF THE INVENTION

Linear actuators wherein a motor rotates an output shaft in response to a voltage input signal, and thereby controls displacement of a linear displacement output shaft are known in the art. In conventional linear actuators, the linear displacement output shaft and motor are coupled to one another by means of a mechanical gear train mechanism. This arrangement is satisfactory for many applications, but reliability and high precision are limited as a result of backlash and hysteresis inherent in the mechanical drive mechanism. Hysteresis and backlash also limit the response time and the high speed capabilities of conventional linear actuators.

Prior art linear actuators are typically arranged with the motor and the linear displacement output shaft positioned end-to-end with respect to one another. This configuration results in a linear actuator of significant length. The awkward dimensions of conventional linear actuators complicate installation, and may render the actuators unsuitable for use in certain applications.

Conventional linear actuators feature open loop control. When voltage input signals are communicated to the motor in an open loop control system, corresponding linear displacements are theoretically achieved each time, but there is no feedback system for monitoring and verifying that result, and correcting it if necessary. As a result of the hysteresis and backlash effects prevalent in conventional linear actuators, input drive voltages frequently do not translate perfectly into linear displacement of the output shaft.

To compensate for linear displacement errors induced by hysteresis and backlash, conventional linear actuators designed for high precision applications employ programmed position overshoots. In other words, the linear actuators are extensively and finely calibrated to determine the positive or negative linear displacement error resulting when specified input voltages are communicated to the motor. The voltage input is adjusted to compensate for the anticipated linear displacement error, and the adjusted input voltage is communicated to the motor. The calibration system is complex and expensive, and it has not generally resulted in the desired high degree of precision.

Accordingly, it is an object of the present invention to provide a high precision linear actuator that is not subject to hysteresis and backlash effects. It is a further object of the present invention to provide a linear actuator capable of precise low speed and high speed bidirectional linear displacements. It is also an object of the present invention to provide a linear actuator having a closed loop control system providing a high degree of reliability, resolution and precision, without requiring extensive calibration

SUMMARY OF THE INVENTION

The high precision linear actuator of the present invention includes an improved, high fidelity mechanical linkage between the motor, which converts voltage input signals to corresponding motor output shaft rotations, and the linear displacement output shaft. The motor output shaft is operably connected, by means of a pulley and belt system, to rotatable spindle and lead nut assemblies, in which a non-rotating output shaft assembly is mounted.

In response to a voltage input signal, the motor drive rotates the motor output shaft which results in corresponding rotation of the spindle and lead nut assemblies, and cause linear displacement of the linear displacement output shaft assembly. Drive input is thereby converted directly and precisely to linear displacement output. The linear actuator components are arranged in a side-by-side configuration to provide a compact device that facilitates convenient installation and mounting in complex devices.

The linear actuator of the present invention also provides closed loop control of the linear displacement output. Closed loop control is preferably accomplished by means of a linear optical encoder assembly that monitors the position of the linear displacement output shaft. As the lead screw undergoes motor driven linear displacement, the linear optical encoder assembly monitors actual output position, and generates a feedback monitor signal representative of the output shaft position.

The feedback monitor signal may be conveyed to an external controller that compares the actual output position with the "ideal" output position corresponding to the voltage input signal. A command signal generated by the external controller activates the motor to move the position of the linear displacement output shaft until the position signal generated by the linear optical encoder assembly indicates that the actual linear displacement of the output shaft corresponds precisely to the input voltage signal. The closed loop control feature of the linear actuator of the present invention provides precise, repeatable linear displacement output.

Linear actuators in accordance with the present invention provide high resolution, bidirectional repeatability, and precise low speed and high speed positioning. Backlash and hysteresis problems are substantially eliminated as a result of high fidelity mechanical linkages. Closed loop control features guarantee repeatable linear displacements corresponding precisely to the voltage input signal.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings, in which:

FIG. 4 shows a fragmentary cross-sectional top view of the linear actuator illustrating the spindle, lead nut assembly and output shaft of the linear actuator of FIG. 1;

FIG. 5 is an enlarged fragmentary top view of the high precision linear actuator of the present invention illustrating the linear optical encoder assembly and a truncated output shaft assembly.

DESCRIPTION OF THE PREFERRED EMBODIMENTS

Linear actuators of the present invention are useful in applications requiring high precision and/or resolution, high speed and variable speed linear displacements. Exemplary applications include multichannel waveguide and fiber alignment, microlithographic process studies, optical probing, micron-scale ablation and materials studies, biomedical applications, micromachining and laser targeting.

Figure 1:
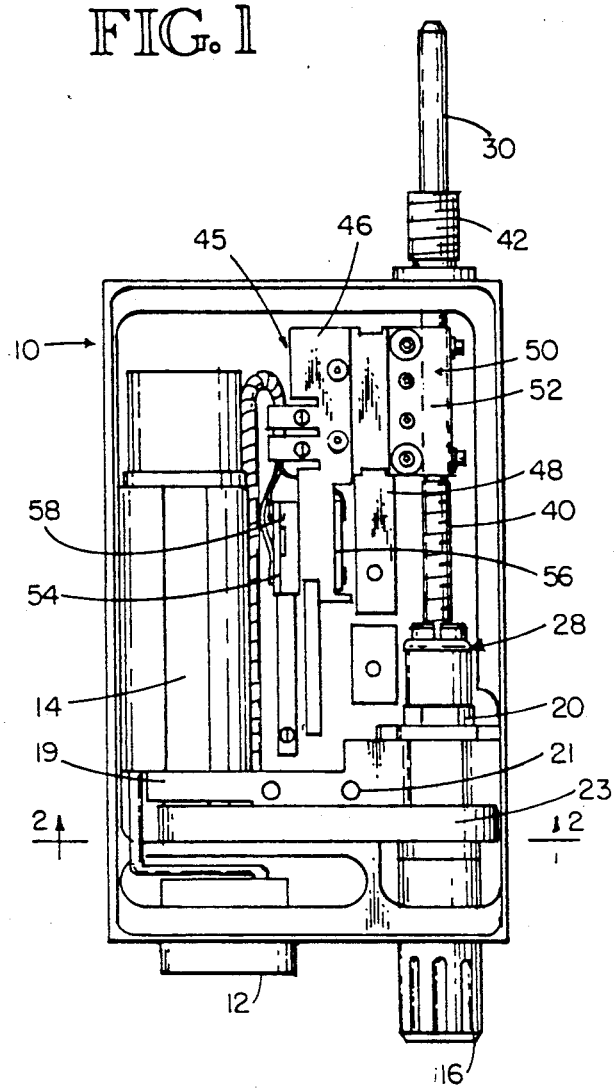
FIG. 1 is a top view of the high precision linear actuator of the present invention, with the top wall of the housing removed.

FIG. 1 illustrates a high precision linear actuator 10 operable by manual or electronically controlled means. Linear actuator 10 includes drive means such as a motor drive 14. As shown schematically in FIG. 6, motor drive 14 is typically electrically connected to an input controller 11 through an electrical connector 12. Input controller 11 generates a digital input command signal, which is transmitted to a digital-to-analog (D/A) converter 13. An analog input signal is thereby transmitted from D/A converter 13 to motor drive 14 through connector 12.

Motor drive 14 is preferably a dc motor, and most preferably a smooth running, high torque dc motor drive. Appropriate motors and connectors are known in the art and are commercially available. Motor drive 14 converts the analog voltage input signal to corresponding rotation of an output shaft 18. Output shaft 18 projects from one end of the motor drive, preferably the "front" end as illustrated in FIG. 1, and projects through a mounting member 19. Mounting member 19 extends substantially the width of linear actuator 10 and provides alignment and support for motor output shaft 18 and an output spindle assembly 20. In the embodiment illustrated in FIG. 1, mounting member 19 is rigidly mounted on the linear actuator housing bottom wall by attachment means mounted in recesses 21. Although mounting member 19 is illustrated as a unitary member, it may be provided as two or more discontinuous members arranged to provide alignment of motor output shaft 18 and spindle assembly 20 on parallel axes.

Output shaft 18 has a sprocket 22 mounted thereon and positioned on the "front" side of mounting member 19. Output spindle assembly 20 likewise comprises a rotatable belt driven sprocket 24 rigidly mounted on a spindle 26, having a lead nut assembly 28 fixedly engaged thereon. The central longitudinal axes of motor drive output shaft 18 and spindle assembly 20 are aligned parallel to each another. Spindle 26, as illustrated in FIG. 4, preferably comprises a single, rod-like tubular member having a knob 16 mounted on one end thereof and a lead nut assembly 28 mounted at the opposite end thereof. Alternatively, spindle 26 may comprise a plurality of pieces rigidly engaged to one another and aligned on a common central longitudinal axis. Knob 16 provides convenient manual operation of the linear actuator.

Figure 2:
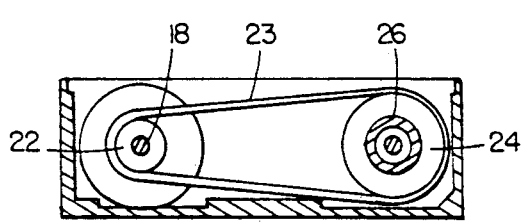
FIG. 2 is a cross-sectional view of the high precision linear actuator of the present invention along line 2—2 of FIG. 1.

As shown in FIG. 2, sprocket 22 mounted on motor drive output shaft 18 drives or is driven by rotation of a drive belt 23, which in turn drives or is driven by spindle assembly sprocket 24. As the motor sprocket 22 or spindle sprocket 24 is rotated in response to motor driven or manual input, respectively, drive belt 23 causes corresponding rotation of the non-driven shaft. As shown in FIG. 2, spindle sprocket 24 preferably has a larger radius than motor sprocket 22. Motor and spindle sprockets 22 and 24, respectively, are preferably provided with teeth having the same configuration and dimensions, and drive belt 23 is also provided with a complementary toothed arrangement along its inner, drive surface. In this manner, a high fidelity mechanical linkage is provided to transfer rotational motion from the drive motor output shaft to the spindle assembly.

Spindle 26 is rigidly mounted to or formed by means of unitary construction with sprocket 24, so that rotation of sprocket 24 causes a corresponding rotation of spindle 26. As shown in FIG. 4, spindle 26 has a threaded portion at one end for mounting knob 16. Sprocket 24 is rigidly mounted on spindle 26, which extends through mounting member 19. Spindle 26 is mounted in mounting member 19 by means of low friction bearings 35, to provide smooth rotation of the spindle corresponding precisely to sprocket rotation. Low friction bearings 35 are mounted between a mounting flange 25 of sprocket 24 and a flange 27 of spindle 26. Suitable low-friction bearings are well known in the art and are commercially available.

Figure 3:
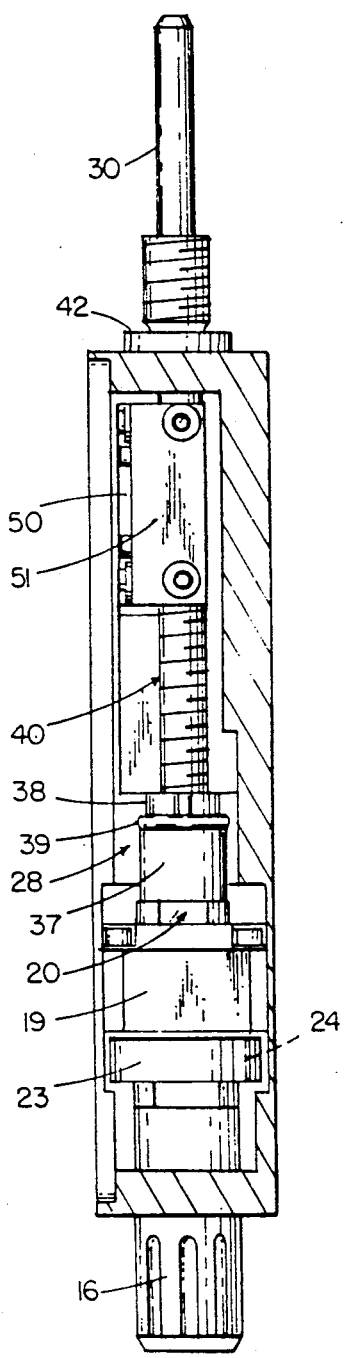
FIG. 3 shows a side view of the linear actuator corresponding to the right-hand side of the actuator shown in FIG. 1, with the side wall of the housing removed.

Lead nut assembly 28 is rigidly mounted adjacent flange 27 of spindle 26. Lead nut assembly 28 is provided with an internally threaded portion 38, with which a lead screw 40 is threadedly engaged. Internally threaded portion 38 may be formed as part of a radial clamping screw having at least one slot 38a aligned generally parallel to the longitudinal axis of lead screw 40. As shown in FIGS. 1 and 3, a plurality of slots 38a may be provided in internally threaded portion 38. When internally threaded portion 38 is slotted, the internal threads may be characterized as discontinuous. Lead nut assembly 28 may comprise a plurality of components, including internally threaded portion 38, an annular collar 37, and a stabilizing ring 39, as shown in FIG. 4. Lead nut assembly 28 rotates with the spindle assembly, and thereby displaces lead screw 40 in linear increments along the central longitudinal axis of spindle assembly 20. It is an important feature of the present invention that lead screw 40 is linearly displaced upon rotation of lead nut assembly 28 without being rotated.

Lead screw 40 is rigidly mounted to or formed as a unit with linear displacement output shaft 30. Linear displacement output shaft 30 preferably comprises a probe-like shaft, such as a standard micrometer barrel, that penetrates the front housing wall of linear actuator 10. Linear displacement output shaft 30 is preferably mounted through an output shaft alignment member 42, which serves to maintain the precise axial alignment of output shaft 30 during operation. Output shaft alignment member 42 is preferably mounted in the front housing wall, and is provided with a threaded portion protruding therefrom to facilitate mounting of the actuator in a device. Output assemblies, including spindle assembly 20, lead nut assembly 28, lead screw 40 and output shaft 30 are aligned on a common central longitudinal axis. In this configuration, alignment of the longitudinal axis of the output assemblies is positively maintained, and the motor drive and spindle assembly are arranged in a generally side-by-side relationship to provide a compact linear actuator device.

The direction of linear displacement of output shaft 30 (i.e. positive or negative from any predetermined reference point) is dependent upon the rotational direction of motor drive output shaft 18. Motor drive 14 provides bidirectional rotational output, reflecting the polarity of the voltage input signal. In the embodiment illustrated in the figures, clockwise rotation of motor drive output shaft 18 causes clockwise rotation of sprocket 24 and spindle assembly 20, and lead nut assembly 28, and linear displacement of output shaft 30 in an extension direction with respect to the linear actuator housing. Likewise, counterclockwise rotation of motor drive output shaft 18 results in linear displacement of output shaft in a retraction direction with respect to the linear displacement housing Linear actuator 10 thereby produces bidirectional linear displacements in response to the polarities of voltage input signals.

Linear actuator 10 provides high fidelity mechanical linkages between motor drive output shaft 18, spindle assembly 20, lead nut assembly 28, lead screw 40, and linear displacement output shaft 30. The mechanical linkages serve to immediately and precisely translate the rotation of motor drive output shaft 18 induced by voltage input signals to rotation of spindle assembly 20 and lead nut assembly 28, and linear displacement of lead screw 40 and output shaft 30. There is no appreciable time lag between voltage input to motor drive 14 and linear displacement of output shaft 30. Moreover, as a result of the high fidelity mechanical linkages provided in linear actuators of the present invention, the load does not influence the accuracy, repeatability or resolution of linear displacements. Additionally, linear actuator 10 has a large force constant, which permits it to move in small, precise increments, thus providing high accuracy and resolution.

Linear actuator 10 additionally includes means for achieving closed loop control of the linear displacement output. One preferred means for providing closed loop control is utilization of a linear optical encoder assembly that continuously monitors the position of the linear displacement output shaft. A linear optical encoder assembly 45 is illustrated in FIGS. 1, 4 and 5 and, in the configuration shown, is arranged generally between motor drive 14 and output shaft 30. An encoder mount 46 and output shaft 30 are rigidly mounted to each other, or formed as a unit, so that encoder mount 46 and the encoder components mounted thereon move linearly as a unit with the output shaft and lead screw.

Encoder mount 46 is slidably engaged on a low friction linear bearing 48, which is oriented parallel to the longitudinal axis of the output assemblies. Linear bearing 48 may take the form of a generally rectangular bar-shaped member having aligned grooves for engaging mounting portions of the encoder mount. Low friction bearing surfaces are provided between the encoder mount and the linear bearing. Encoder mount 4 is rigidly mounted to output shaft 30, so that the encoder mount and components mounted thereon are displaced along linear bearing 48, precisely matching the linear displacement of output shaft 30. A generally right-angled bracket 50, having a side wall 51 rigidly mounted to a flattened portion of output shaft 30, and a top wall 52 rigidly mounted to encoder mount 46, provides a satisfactory mounting arrangement. Alternative mounting arrangements may, of course, be provided.

A preferred linear optical encoder assembly for continuously monitoring the position of the linear displacement output shaft operates according to Moire fringe pattern principles. Linear optical encoder assembly 45 comprises a plurality of light sources, such as an array light emitting diodes (LEDs) 54 mounted on or formed as a unit with encoder mount 46, and the light sources are operably converted to a suitable energy source. LEDs 54 are arranged to emit light along axes generally perpendicular to the longitudinal axis of output shaft 30.

Linear optical encoder assembly 45 additionally comprises an array of light sensors 56 mounted on a light sensor mounting member positioned opposite the light sources. Suitable light sensors are capable of measuring light intensity, and are arranged substantially aligned with and opposite the array of light sources. The light sensors are in electrical communication with a controller means and capable of conveying a signal representative of light intensity to a controller.

A reference grating 58 is rigidly mounted on the encoder mount 46 and interposed between the array of light sources and light sensors. Reference grating 58 is mounted adjacent the array of light sources in the embodiment illustrated in FIG. 5, and has a grating pattern provided thereon. A stationary grating 60 is mounted in fixed relationship with respect to and interposed between the array of light sources and light sensors. Stationary grating 60 has a grating pattern provided thereon, and in cooperation with reference grating 58, provides Moire light pattern information relating to the position of output shaft 30. The grating patterns provided on gratings 58 and 60 are similar.

To continuously monitor the position of output shaft 30, the array of light sources, such as LEDs, is energized and light is directed through reference grating 58 toward stationary grating 60. When the grating patterns on reference grating 58 and stationary grating 60 are aligned, light penetrates both gratings and high intensity light impinges on the sensors. When reference grating 58 (along with encoder mount 46 and output shaft 30) is linearly displaced by a distance defined as one half of a grating period (a grating period being defined as the distance between adjacent grating pattern lines), the intensity of light passing through reference grating 58 and stationary grating 60 and impinging on the light sensors will attain a minimum or null value. The period of the maximum and minimum intensity values of light passing through reference grating 58 and stationary grating 60 and measured by the light sensors is proportional to the grating period, which affects the intensity distribution of the diffracted light.

The number of intensity maxima and minima detected by the sensors is indicative of the linear distance traveled by encoder mount 46 and output shaft 30, and thereby the position of the linear displacement output shaft. When the light intensity is between intensity maxima and minima, the intensity varies as a known function of linear distance traveled by grating lines of the reference grating between next adjacent grating lines of the stationary grating. Consequently, the precise distance traveled by output shaft 30 may be ascertained by counting the number of complete grating periods traversed, in combination with any incomplete grating period. Moreover, Moire fringe pattern monitoring need not be commenced from a point of light intensity maximum or minimum. Grating period counts may be obtained from any reference starting point, with a single period being equivalent to the distance between measurements of light intensity equal to the light intensity at the starting point.

Use of Moire fringe patterns for measuring linear displacements is generally known in the art. Although linear displacement measurements based upon Moire fringe pattern principles are preferred to provide position feedback and monitoring in the linear actuator of the present invention, other feedback and monitoring systems may also be adopted.

Figure 6:
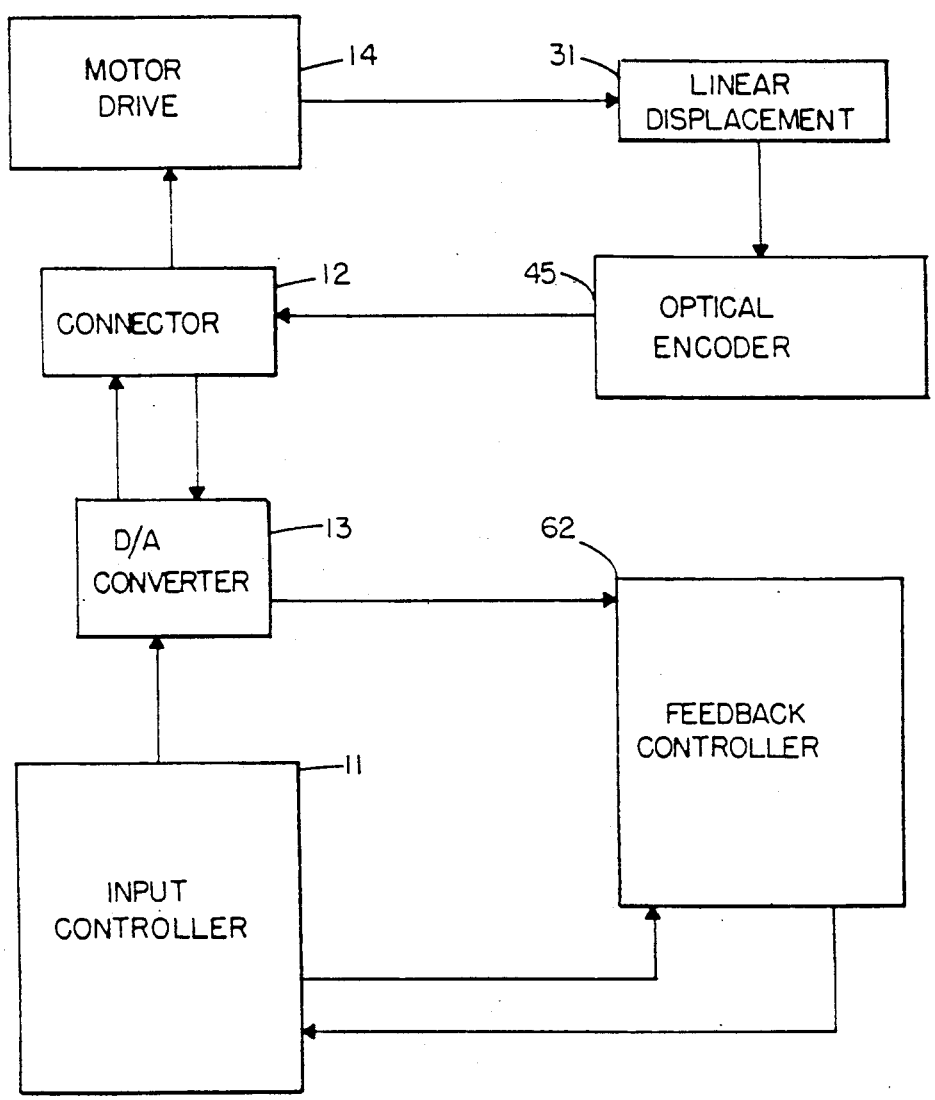
FIG. 6 shows a schematic flow diagram illustrating operation of linear actuators of the present invention including closed loop control features.

In operation, as shown schematically in FIG. 6, a voltage input signal is conveyed to motor drive 14 through connector 12 fr  input controller 11. Motor drive 14 is activated and produces rotational output corresponding to the voltage input signal. The high fidelity mechanical linkages provided in linear actuator 10 precisely convert rotation of the motor drive output shaft to rotation of the output spindle and lead nut assemblies, which produces an output shaft linear displacement 31. Output shaft linear displacement 31 is conveyed as input to optical linear encoder 45. An analog position signal corresponding to the linear displacement recorded by the sensors is conveyed to analog-to-digital converter, and a corresponding digital signal is transmitted to a feedback controller 62. Sensor output corresponding to the output shaft position is compared in feedback controller 62 with the output shaft position corresponding to the voltage input, to determine when the actual linear displacement output corresponds precisely to the voltage input signal. When the position signal corresponding to linear displacement corresponds precisely to the input voltage signal, input controller 11 relays a stop signal to motor drive 14.

Linear actuators according to the present invention may be constructed to provide incremental movements of 0.1 micrometer, with 0.1 micrometer resolution and 0.1 micrometer bidirectional repeatability, and 1.0 micrometer absolute accuracy over full travel. As is evident from the description set forth above, operation of the linear encoder of the present invention is not dependent upon the speed at which the linear displacement takes place. Consequently, the apparatus of the present invention can be operated over a wide range of displacement speeds. Preferably, linear displacement is achieved at speeds from about 0.5 micrometers/second to about 25 millimeters/second. In addition, programmable optical limit switches may be provided.

It will be obvious to those having skill in the art that many changes may be made to the details of the above-described preferred embodiments of the present invention without departing from the underlying principles thereof. The scope of the present invention should, therefore, be determined only by the following claims.

I claim:

1. A high precision linear actuator comprising:
   a motor drive for receiving a voltage input signal and converting said voltage input signal to rotation of a motor drive output shaft;
   a linear displacement output shaft operably connected to said motor drive output shaft to provide linear displacement of said output shaft corresponding t said rotation of said rotor drive output shaft; and
   an optical linear encoder assembly comprising an array of light sources arranged to emit light along axes generally perpendicular to a longitudinal axis of said linear displacement output shaft, an array of light sensors positioned substantially opposite and aligned with said array of light sources, a stationary grating mounting between said arrays of light sources and light sensors, and a reference grating mounted adjacent said array of light sources, said optical linear encoder assembly operably connected to said linear displacement output shaft to provide linear displacement of said optical linear encoder assembly corresponding to said linear displacement of said linear displacement output shaft.

2. A high precision linear actuator according to claim 1, further comprising a rotatable lead nut assembly operably linked to said motor drive output shaft and said linear displacement output shaft to provide rotation of aid lead nut assembly corresponding too said rotation of said motor drive output shaft.

3. A high precision linear actuator according to claim 2, wherein said linear displacement output shaft comprises a non-rotatable lead screw threadedly engaged in said rotatable lead nut assembly to provide linear displacement of said lead screw corresponding to said rotation of said lead nut assembly.

4. A high precision linear actuator according to claim 1, additionally comprising a linear bearing guideway oriented substantially parallel to and operatively connected to said linear displacement output shaft to guide linear displacement of said linear displacement output shaft and wherein said linear displacement output shaft and said linear bearing guideway are arranged in a generally side-by-side relationship.

5. A high precision linear actuator according to claim 1, wherein said motor drive output shaft and said linear displacement output shaft are operably linked by a belt drive means.

6. A high precision linear actuator according to claim 4, wherein said non-rotatable lead screw is displaceable along a predetermined linear path and said linear bearing guideway is capable of guiding the displacement of said non-rotatable lead screw over the length of the predetermined linear path.

7. A high precision linear actuator according to claim 2, wherein said rotatable lead nut assembly comprises a radial clamping screw having at least one slot oriented generally parallel to a longitudinal axis of said non-rotatable lead screw.

8. A high precision linear actuator according to claim 4, wherein said optical linear encoder assembly is slidably mounted on said linear bearing guideway.

9. A high precision linear actuator according to claim 1, further comprising a rotatable knob operably linked to said linear displacement output shaft to provide manual rotation of said lead nut assembly.

10. A high precision linear actuator according to claim 1, further comprising an input controller operably connected to said motor drive to provide said voltage input signal to said motor drive.

11. A high precision linear actuator according to claim 1, wherein said optical linear encoder assembly is capable of continuously monitoring the position of said linear displacement output shaft.

12. A high precision linear actuator according to claim 1, wherein said reference grating and said stationary grating have similar grating patterns.

* * * * *